Nov. 1, 1960 J. C. LEBENS 2,958,750

PROTECTORS FOR ELECTRIC CIRCUITS

Filed March 25, 1957

INVENTOR
JOHN C. LEBENS
BY Roy Eilers ATT'Y.

United States Patent Office 2,958,750

Patented Nov. 1, 1960

2,958,750

PROTECTORS FOR ELECTRIC CIRCUITS

John C. Lebens, University City, Mo., assignor to McGraw-Edison Company, Elgin, Ill., a corporation of Delaware Filed Mar. 25, 1957, Ser. No. 648,124

4 Claims. (Cl. 200—133)

Figure 2:
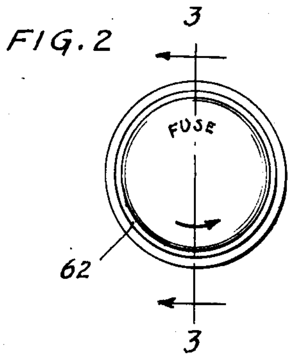

This invention relates to improvements in protectors for electric circuits. More particularly, this invention relates to improvements in holders for protectors for electric circuits.

It is therefore an object of the present invention to provide an improved holder for protectors for electric circuits.

Electric fuses and other protectors for electric circuits can sometimes be used in connection with electrial equipment that radiates or absorbs electrical waves having frequencies that enable those waves to interfere with radio, television and radar signals. Unless those fuses or other protectors are shielded, they can radiate or absorb electrical waves having frequencies that enable those waves to interfere with radio, television or radar signals. If it were not essential that the fuses or other protectors be readily accessible, for checking and replacement, it would be a simple matter to shield those fuses and protectors; but such accessibility is absolutely essential. The present invention makes it possible to shield fuses or other protectors so they will not radiate or absorb electrical waves that can interfere with radio, television or radar signals, as by providing a holder, for fuses or other protectors, that has a shielded closure. It is therefore an object of the present invention to provide a holder for electric fuses and other protectors for electric circuits which has a shielded closure that facilitates ready checking and replacement of those fuses and protectors while preventing radiation and absorption of electrical waves from and by those fuses and protectors.

The holder provided by the present invention has a portion which can extend through the metal wall of the enclosure for the electrical equipment, and it also has a portion which is external of that wall; and that external portion has a metal shield. Part of that shield is movable with the closure for the holder, but the other part of that shield is stationary. When the two parts of the shield are assembled, they effectively prevent radiation or absorption of electrical waves from or by the fuse or other protector. Yet, the two parts of the shield are readily separable to provide ready and full access to the fuse or other protector for purposes of checking or replacement. It is therefore an object of the present invention to provide a holder for electric fuses or other protectors for electric circuits that has a portion which can extend through one wall of an enclosure for electrical equipment and that has a shielded portion which is external of that wall.

The stationary part of the shield, for the external part of the holder, is bonded to the wall of the enclosure, as for example by solder. Where it is desirable to have a water-tight engagement between the holder and the said wall, the solder will be applied to the shield and to the said wall in such a way that a water-tight joint is formed. Also, the two parts of the shield will be formed so they can be sealed by a resilient sealing ring while also being electrically interconnected. It is therefore an object of the present invention to provide a two part metal shield for the portion of a holder external of the wall of a closure for electrical equipment, and to bond the fixed part of that shield to that wall and to seal the two parts of that shield by a resilient sealing ring while electrically interconnecting those parts of that shield.

The two parts of the metal shield provided by the present invention have a springy engagement with each other that assures positive electrical interconnection of those two parts. In one modification of the present invention, one part of the shield has springy fingers that extend within the other part of the shield, and those fingers engage a surface that springs those fingers. The springing of those fingers provides a full and complete electrical interconnection of the two parts of the shield. It is therefore an object of the present invention to provide a shield for the external portion of a holder for fuses and other protectors which has one part equipped with fingers that have a springy engagement with a surface on the other part of the shield, thereby assuring complete electrical interconnection of the two parts of the shield.

The surface of the other part of the shield, that is engaged by the springy fingers of the one part of that shield, is tapered slightly; and that taper is desirable because it enables a small force on the two parts of the shield to effect the requisite springing of those fingers. That taper is also desirable because it facilitates the requisite distortion of the resilient sealing ring as the two parts of the shield are assembled.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 1:
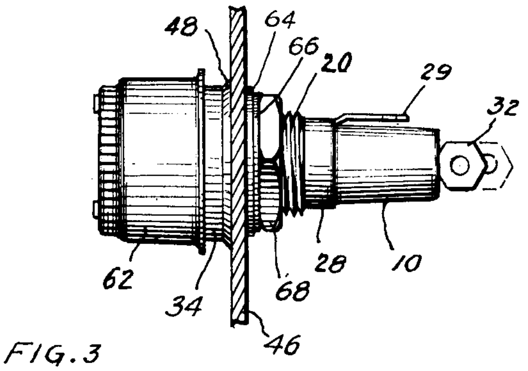
Figures 3, 4, 5:
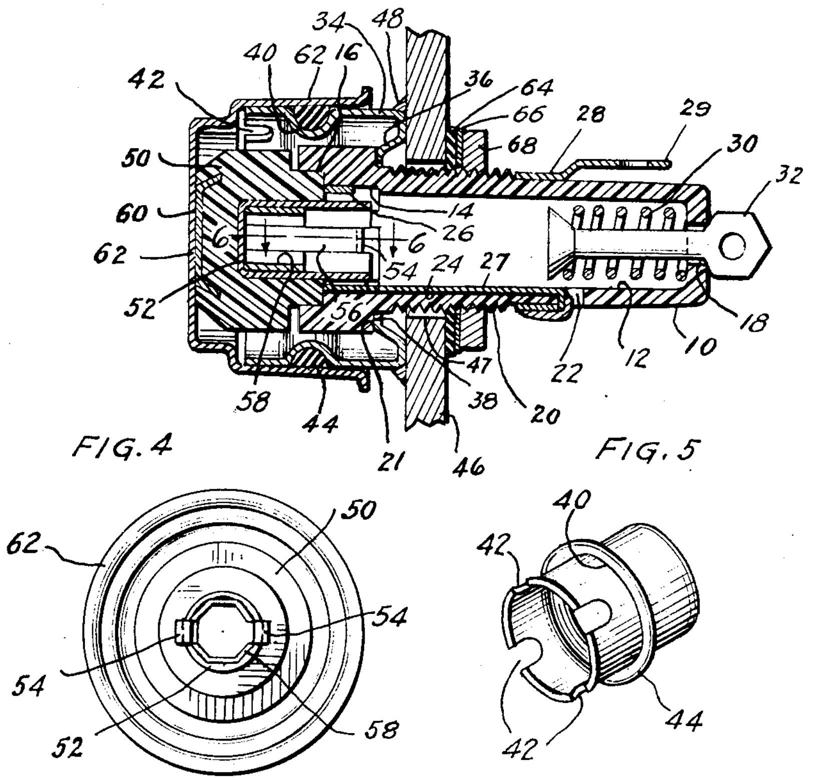
Figure 6:
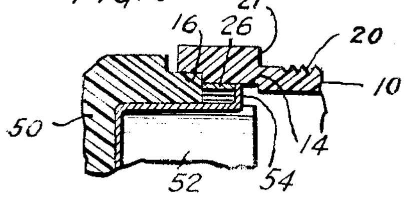

In the drawing, Fig. 1 is a side elevational view of one form of holder, for electric fuses or other protectors for electric circuits, that is provided by the present invention, and it shows that holder extending through a wall that is shown in section in Fig. 1, Fig. 2 is a front elevational view of the holder shown in Fig. 1, Fig. 3 is a longitudinal sectional view, on an enlarged scale, through the holder of Figs. 1 and 2, and it is taken along the plane indicated by the line 3—3 in Fig. 2, Fig. 4 is a rear elevational view on said enlarged scale of the closure and movable part of the shield for the holder of Figs. 1 and 2, Fig. 5 is a perspective view of the stationary part of the shield for the holder of Figs. 1 and 2, and Fig. 6 is a longitudinal sectional view through a portion of the holder shown in Figs. 1–3, and it emphasizes the bayonet joint between the closure-carried contact and the fixed contact of that holder.

Referring to the drawing in detail, the numeral 10 generally denotes the body portion of a holder for electric fuses. That body portion will preferably be made of an insulating material such as Bakelite; and that body portion has a longitudinally extending bore 12 extending throughout the greater part of the length thereof. A larger diameter bore 14 of relatively short length is provided adjacent the outer end of the bore 12; and a bore 16 of still larger diameter abuts the outer end of the bore 14. As a result, the bores 12, 14 and 16 define a hollow space within the body portion 10 that has three different diameters; and those diameters become progressively smaller from the outer to the inner end of that hollow space.

An opening 18 is formed in the end wall of the body portion 10, and that opening is at the geometric center of that end wall. An opening 22 is provided in the side wall of the body portion 10, at a point intermediate the ends of that body portion, and that opening communicates with the bore 12. That opening also communicates with a narrow, axially-extending slot 24 which is formed in the inner face of that part of the body portion 10 which defines the bore 12; and the slot 24 extends to, and is contiguous with, the bore 14.

A radially extending portion is formed on the exterior of the body portion 10, and that radially extending portion is generally coextensive with the bores 14 and 16. That radially extending portion defines a radially-extending shoulder 21 for the body portion 10. A helical thread 20 is formed on the exterior of the body portion 10, and that thread begins at a point adjacent the opening 22 and extends forwardly to a point adjacent the shoulder 21.

The numeral 26 denotes a generally U-shaped stationary contact that is similar in configuration, purpose and function to the generally U-shaped stationary contact disclosed and described in Manfred F. Duerkob Patent No. 2,668,215 which was granted February 2, 1954 for Holders For Cartridge Enclosed Protectors For Electric Circuits. That contact has the U-shaped portion thereof disposed within the bore 14 of the body portion 10, and it has an elongated projection 27 which is disposed within the slot 24 of that body portion. The right-hand end of the projection 27 is bent to extend outwardly through the opening 22, as shown particularly in Fig. 3. A ring 28, which has a tang 29 projecting therefrom, is telescoped over the body portion 10; and that ring is suitably connected to the outwardly extending portion of the projection 27 by solder. In this way, the tang 29 of the ring 28 is electrically connected to the U-shaped contact 26.

A helical spring 30 is disposed within the bore 12 of the body portion 10; and the outer diameter of that spring is appreciably less than the inner diameter of the bore 12, as shown particularly in Fig. 3. A movable contact 32 has a fuse-engaging end in the form of a truncated cone, and it also has a cylindrical shank. The truncated cone end of the movable contact 32 has a diameter larger than the inner diameter of the helical spring 30; and the shank of that movable contact has a diameter smaller than the inner diameter of the helical spring 30 and smaller than the diameter of the opening 18. That shank is telescoped through the spring 30 and through the opening 18 in the body portion 10, and then is planished and perforated. The planished end of the movable contact 32 is wider than the opening 18 and thereby prevents accidental separation of that contact from the body portion 10. The spring 30 biases the movable contact 32 toward the open end of the body portion 10 but can yield to permit movement of that movable contact to the right. The normal position of the movable contact 32, when a fuse is not disposed in the holder, is indicated by solid lines in Figs. 1 and 3. The position of the movable contact 32 when a fuse is in the fuse holder is indicated by dotted lines in Fig. 1.

The numeral 34 generally denotes the stationary part of a two-part metal shield provided for electric fuses held by the housing of the present invention. The stationary part 34 of the shield is generally tubular in configuration, and it has a reentrant end wall 36 which has a concentric opening 38 through it. That opening is large enough to telescope over the thread 20 on the body portion 10 but is smaller than the radially-extending section of the body portion 10 which defines the radially-extending shoulder 21. The reentrant character of the end wall 36 disposes the opening 38 to the left of the plane defined by the right-hand face of that end wall 36.

An annular groove 40 is formed in the stationary part 34 of the shield, and that groove is intermediate the ends of that shield. That annular groove is semi-circular in cross section, and it can accommodate an O-ring 44 of resilient material. The outer end of the stationary part 34 is provided with a number of axially extending notches 42, and those notches define intervening fingers that are springy. The outer ends of those fingers are flared slightly.

The body portion 10 and the contact ring 28 with its tang 29 telescope readily through an opening 47 in a metal wall 46 of a shielded enclosure for electrical equipment. The reentrant wall 36 of the stationary part 34 of the shield will preferably be permanently bonded to that wall by solder 48. If desired, however, the requisite electrical engagement between the wall 46 and the stationary part 34 of the shield can be attained by mechanically holding that part in intimate engagement with that wall. Where the enclosure for the electrical equipment must be made water-tight, the solder 48 will be formed as a continuous water-tight ring. In those instances where water-tightness is not essential and solder is to be used, the solder 48 need only make a good electrical connection between the wall 46 and the end wall 36 of the stationary part 34 of the shield.

The numeral 50 denotes a closure of insulating material which has an elongated cup-like contact 52 molded in it. That contact is of metal, and it will be suitably mounted in a mold in which the closure 50 is formed. At the completion of the molding step, the closure 50 and the contact 52 will be integral. A metal plate 60 will also be mounted in that mold prior to the formation of the closure 50, and that metal plate will also be integral with the closure 50 at the completion of the molding step.

The contact 52 has elongated ridges 56 at the opposite sides thereof, and has radially extending projections 54 adjacent the outer ends of those ridges, all as disclosed in the said Duerkob patent. The projections 54 will selectively underlie the right-hand surfaces of the U-shaped contact 26 and will coact with those surfaces to form a bayonet joint whenever the closure 50 is assembled with the body portion 10. However, when it is desired to separate the closure 50 from the body portion 10, it is only necessary to rotate the closure 50 until the projections 54 thereof are in alignment with the gap and notch of the U-shaped contact 26; and thereupon the closure 50 can be withdrawn. The ridges 56, which are contiguous with the projections 54, are intended to spread the sides of the U-shaped contact 26 and thereby assure full electrical engagement between that contact and the closure-carried contact 52.

A spring 58, in the form of an elongated flat strip, is bent to fit within the cup-shaped, closure-carried contact 52. That strip in effect defines a polygon, and the sides of the polygon are chords of the circle defined by the contact 52. That spring will accommodate one end terminal of a small enclosed fuse or other protector, and it will prevent accidental separation of that fuse or protector from the cup-shaped contact 52.

The numeral 62 denotes the movable part of the metal shield, and that part is generally cup-shaped. That part is fixedly secured to the plate 60, and thus to the closure 50, by solder. The sides of the movable part 62 are not truly cylindrical; instead they taper slightly. As a result, those sides define a larger circle at the right-hand end thereof than they do at the left-hand end thereof. The tapering sides of the movable part 62 of the shield enable that part to spring the fingers defined by the notches 42 in the stationary part 34 of the shield. The springing of those fingers coacts with the angularity of the flared outer ends of those fingers to insure an intimacy of engagement between the two parts of the shield that assures full electrical interconnection between those two parts of that shield. The overall result is that the two parts of the shield constitute, in effect, one integral shielding enclosure for the projecting end of a fuse disposed within the holder. The movable part 62 of the shield will telescope over the O-ring 44 and will compress it to the configuration shown in Fig. 3. That O-ring will keep moisture or liquid from entering the joint between the two parts 34 and 62 of the shield.

A resilient washer 64 can be disposed at the rear face of the wall 46, and an unyielding washer 66, preferably of metal, can be disposed adjacent the rear face of the washer 64. A nut 68 will thread onto the thread 20 of the body portion 10 and fixedly hold the body portion 10, the stationary part 34 of the shield, and the wall 46 in assembled relation. The nut 68 will be tightened to the point where the resilient washer 64 will form a liquid-tight seal between the wall 46 and the body portion 10.

To insert a replacement fuse within the holder, it is only necessary to grasp the movable part 62 of the shield and rotate it to place the projections 54 on the cup-shaped contact 52 in register with the gap and notch of the U-shaped contact 26. Thereafter, an outward pull on the movable part 62 of the shield will separate that movable part and the closure 50 and the fuse from the body portion 10 and from the stationary part 34 of the shield. The replacement fuse can then be substituted for the old fuse merely by withdrawing the old fuse from the cup-shaped contact 52 and inserting its replacement. Thereafter, the movable part 62 of the shield is moved into register with the stationary part 34 of that shield, and the cup-shaped contact 52 has its projections 54 telescoped through the gap and notch of the U-shaped contact 26. Thereafter the movable part 62 of the shield is rotated to provide the requisite locking of the bayonet joint.

The spring 30 will yield as the fuse is pushed into position; and in yielding, that fuse will develop additional compressive forces that will hold the end of the movable contact 32 in intimate electrical engagement with the inner end of the fuse. The spring 58 within the cup-shaped contact 52 will be sprung as the end terminal is pushed into that contact, and the ridges 56 on that contact will spring the sides of the U-shaped contact 26. In these ways, full electrical contact is assured between the fuse and the various contacts of the holder.

The enclosure, of which the wall 46 is a part, will constitute a full and adequate shield for the inner portion of the fuse, for the contact 32, and for the ring 28 and its tang 29. The two parts 34 and 62 of the shield will fully and completely shield the projecting end of the fuse and will also shield the contact 52. Hence, the fuse will be electrically shielded and yet will be readily accessible for checking or replacing.

Whereas the drawing and accompanying description have shown and described a preferred embodiment of the present invention, it should be apparent to those skilled in the art that various changes may be made in the form of the invention without affecting the scope thereof.

What I claim is:

1. A shielded holder for protectors for electric circuits which comprises a stationary part and a movable part, a cup-shaped metallic element that is adapted to be secured in electrical-transferring relation to a metal wall, said cup-shaped metallic element having an opening through it to accommodate a portion of said stationary part of said holder for protectors for electric circuits, and a second cup-shaped metallic element that is dimensioned and that is adapted to be secured in electrical-transferring relation with the first said cup-shaped metallic element, said movable part of said holder for protectors for electric circuits being adapted to engage and be held in assembled relation with said stationary part of said holder for protectors for electric circuits or to be separated from said stationary part of said holder for protectors for electric circuits, said second cup-shaped metallic element and said movable part of said holder for protectors for electric circuits being secured together so said second cup-shaped metallic element can be gripped to effect movement of said movable part of said holder for protectors for electric circuits relative to said stationary part of said holder for protectors for electric circuits, said second cup-shaped metallic element being in said electrical-transferring relation with the first said cup-shaped metallic element whenever said movable part of said holder for protectors for electric circuits is held in said assembled relation with said stationary part of said holder for protectors for electric circuits, one of said cup-shaped metallic elements being larger than and telescoping over the other of said cup-shaped metallic elements and thereby cause said cup-shaped elements to completely enclose said movable part and the said rest of said stationary part of said holder for protectors for electric circuits, said second cup-shaped metallic element being readily separable from the first said cup-shaped metallic element to separate said movable part of said holder for protectors for electric circuits from said stationary part of said holder for protectors for electric circuits to provide access to a protector for electric circuits held by said holder for checking or replacing, said other cup-shaped metallic element having resilient portions that telescope within and are engageable with and sprung by the interior of said one cup-shaped metallic element to place said cup-shaped metallic elements in electrical-transferring relation.

2. A shielded holder for protectors for electric circuits which comprises a stationary part and a movable part, a cup-shaped metallic element that is adapted to be secured in electrical-transferring relation to a metal wall, said cup-shaped metallic element having an opening through it to accommodate a portion of said stationary part of said holder for protectors for electric circuits, a second cup-shaped metallic element that is dimensioned and that is adapted to be secured in electrical-transferring relation with the first said cup-shaped metallic element, said movable part of said holder for protectors for electric circuits being adapted to engage and be held in assembled relation with said stationary part of said holder for protectors for electric circuits or to be separated from said stationary part of said holder for protectors for electric circuits, said second cup-shaped metallic element and said movable part of said holder for protectors for electric circuits being secured together so said second cup-shaped metallic element can be gripped to effect movement of said movable part of said holder for protectors for electric circuits relative to said stationary part of said holder for protectors for electric circuits, said second cup-shaped metallic element being in said electrical-transferring relation with the first said cup-shaped metallic element whenever said movable part of said holder for protectors for electric circuits is held in said assembled relation with said stationary part of said holder for protectors for electric circuits, one of said cup-shaped metallic elements being larger than the other of said cup-shaped metallic elements, said other cup-shaped metallic element having a plurality of springy fingers at the open end thereof, said other cup-shaped metallic element having a peripheral groove therein intermediate the closed end thereof and said springy fingers, and a resilient O-ring disposed within said groove, said springy fingers normally extending radially beyond the periphery of said resilient O-ring but being bendable inwardly, said second cup-shaped metallic element telescoping over said springy fingers and over said resilient O-ring and bending said springy fingers inwardly while compressing said resilient O-ring, whereby full sealing and full electrical-transferring engagement of said cup-shaped metallic elements are attained.

3. A holder, for a protector for electric circuits, that comprises a hollow body with a first portion of small transverse dimensions and with a second portion of larger transverse dimensions, said first and said second portions of said hollow body coacting to define a shoulder on said hollow body, a closure member for said hollow body, metallic contacts that are carried by said hollow body and by said closure member and that place a protector for electric circuits within said hollow body in an electrical circuit, said first portion of said hollow body being dimensioned to be telescoped into and to be lodged within an opening in a metallic wall at the exterior of a shielded closure, said second portion of said hollow body being too large to be telescoped into and to be lodged within said opening in said metallic wall at the exterior of said shielded enclosure, a cup-shaped metallic element that has an opening in the end wall thereof which is larger than said first portion of said hollow body but is smaller than said second portion of said hollow body, said opening in said end wall of said cup-shaped metallic element being telescoped over said first portion of said hollow body and said end wall of said cup-shaped metallic element underlying and abutting said shoulder and the cup-shaped portion of said cup-shaped metallic element extending forwardly from said shoulder to form the stationary part of a shielding enclosure for said second portion of said hollow body and for said closure, said end wall of said cup-shaped metallic element being adapted to abut and to be held fixedly in electrically-conducting relation with said metallic wall at the exterior of said shielded enclosure, and a second cup-shaped metallic element that is the movable part of said shielding enclosure for said second portion of said hollow body and for said closure, said closure being permanently secured to the end wall of said second cup-shaped metallic element, said second cup-shaped metallic element electrically engaging the first said cup-shaped metallic element and thereby assuring full shielding of said second portion of said hollow body and of said closure whenever said closure is in assembled relation with said hollow body, interacting surfaces on said hollow body and on said closure that selectively lock said closure in assembled relation with said hollow body, said metallic wall of said shielded enclosure preventing the escape of radiation from those portions of a protector for electric circuits which are held within said shielded enclosure, the first said and said second cup-shaped metallic elements preventing the escape of radiation from those portions of said protector for electric circuits which are within said shielding enclosure, said second cup-shaped metallic element constituting a finger-receiving surface that can be gripped to effect movement of said closure relative to said hollow body and thereby facilitate the engagement and disengagement of said interacting surfaces on said hollow body and on said closure during the installation or removal of said protector for electric circuits.

4. A holder, for a protector for electric circuits, that comprises a hollow body, a closure member for said hollow body, metallic contacts that are carried by said hollow body and by said closure member and that place a protector for electric circuits within said hollow body in an electrical circuit, a portion of said hollow being dimensioned to be telescoped into and to be lodged within an opening in a metallic wall at the exterior of a shielded enclosure, a cup-shaped metallic element that has an opening therein that is adapted to be alined with said opening in said wall at the exterior of said shielded enclosure and that is dimensioned to telescope over said portion of said hollow body, said cup-shaped metallic element being adapted to abut and to be held fixedly in electrically-conducting relation with said metallic wall at the exterior of said shielded enclosure and to constitute the stationary part of a shielding enclosure for said closure and for that portion of said hollow body which projects outwardly from said opening in said metallic wall at the exterior of said shielded enclosure, and a second cup-shaped metallic element that is the movable part of said shielding enclosure for said closure and for said portion of said hollow body which projects outwardly from said opening in said metallic wall at the exterior of said shielded enclosure, said closure being permanently secured to said second cup-shaped metallic element, said second cup-shaped metallic element electrically engaging the first said cup-shaped metallic element and thereby assuring full shielding of said closure and of said portion of said hollow body which projects outwardly from said opening in said metallic wall at the exterior of said shielded enclosure whenever said closure is in assembled relation with said hollow body, interacting surfaces on said hollow body and on said closure that selectively lock said closure in assembled relation with said hollow body, said second cup-shaped metallic element constituting a finger-receiving surface that can be gripped to effect movement of said closure relative to said hollow body and thereby facilitate the engagement and disengagement of said interacting surfaces on said hollow body and on said closure during the installation or removal of said protector for electric circuits.

References Cited in the file of this patent

UNITED STATES PATENTS

| | | |
|---|---|---|
| 688,031 | Sachs | Dec. 3, 1901 |
| 1,203,316 | Downes | Oct. 31, 1916 |
| 1,602,227 | Hentschel | Oct. 5, 1926 |
| 1,780,133 | Klupfel | Oct. 28, 1930 |
| 2,063,786 | Bowman | Dec. 8, 1936 |
| 2,140,442 | Clark | Dec. 13, 1938 |
| 2,144,139 | Batcheller | Jan. 17, 1939 |
| 2,187,427 | Middleton | Jan. 16, 1940 |
| 2,325,770 | Henderson | Aug. 3, 1943 |
| 2,627,359 | Woodward | Feb. 3, 1953 |
| 2,723,328 | Verkuil | Nov. 8, 1955 |